United States Patent

Hester

(10) Patent No.: US 8,415,937 B2
(45) Date of Patent: Apr. 9, 2013

(54) SWITCHING METHOD TO IMPROVE THE EFFICIENCY OF SWITCHED-MODE POWER CONVERTERS EMPLOYING A BRIDGE TOPOLOGY

(75) Inventor: Richard K. Hester, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 234 days.

(21) Appl. No.: 12/872,896

(22) Filed: Aug. 31, 2010

(65) Prior Publication Data

US 2012/0049818 A1  Mar. 1, 2012

(51) Int. Cl.
*G05F 1/56* (2006.01)
*G05F 1/565* (2006.01)
*G05F 1/575* (2006.01)

(52) U.S. Cl. .......... 323/282; 323/271; 323/283

(58) Field of Classification Search ........... 323/222, 323/271, 282–285
See application file for complete search history.

(56) References Cited

U.S. PATENT DOCUMENTS

| | | | |
|---|---|---|---|
| 5,734,258 A | 3/1998 | Esser | |
| 6,037,755 A | 3/2000 | Mao et al. | |
| 6,166,527 A | 12/2000 | Dwelley et al. | |
| 6,348,781 B1 * | 2/2002 | Midya et al. | 323/224 |
| 6,788,033 B2 | 9/2004 | Vinciarelli | |
| 6,977,488 B1 | 12/2005 | Nogawa et al. | |
| 6,984,967 B2 | 1/2006 | Notman | |
| 7,176,667 B2 | 2/2007 | Chen et al. | |
| 2009/0039852 A1 * | 2/2009 | Fishelov et al. | 323/283 |
| 2010/0164449 A1 * | 7/2010 | Dwarakanath et al. | 323/282 |
| 2010/0206378 A1 * | 8/2010 | Erickson et al. | 136/259 |
| 2011/0006743 A1 * | 1/2011 | Fabbro | 323/282 |
| 2011/0285365 A1 * | 11/2011 | de Cremoux et al. | 323/271 |
| 2012/0062030 A1 * | 3/2012 | Xu et al. | 307/31 |
| 2012/0126627 A1 * | 5/2012 | Tonicello et al. | 307/82 |

OTHER PUBLICATIONS

PCT Search Report mailed Feb. 28, 2012.

* cited by examiner

*Primary Examiner* — Adolf Berhane
*Assistant Examiner* — Nusrat Quddus
(74) *Attorney, Agent, or Firm* — Alan A. R. Cooper; Wade J. Brady, III; Frederick J. Telecky, Jr.

(57) ABSTRACT

Traditionally, buck-boost switching regulators with bridge topologies have been avoided due to their inability to seamlessly transition between buck mode and boost mode. Here, however, a buck-boost switching regulator with a bridge topology has been provided, which has an improved controller. Namely, a processor (such as a digital signals processor or DSP) provides digital control for the bridge to enable it so substantially seamlessly transition between buck mode and boost mode.

16 Claims, 1 Drawing Sheet

SWITCHING METHOD TO IMPROVE THE EFFICIENCY OF SWITCHED-MODE POWER CONVERTERS EMPLOYING A BRIDGE TOPOLOGY

TECHNICAL FIELD

The invention relates generally to power converters and, more particularly, to power converters using a bridge topology.

BACKGROUND

There are a number of applications that may need a switching regulator or switched mode power supply to operate in non-inverting buck or boost modes, transitioning relatively seamlessly between the two. Turning to FIG. 1, an example of a bridge 100, which can operate in boost and buck modes can be seen. This bridge 100 is generally an H-bridge, using switches S1 to S4, and an inductor L, which is coupled between the switching nodes of the H-bridge. In buck mode, switches S4 and S3 are closed and open, respectively, while pulse width modulation (PWM) signals are provided to switches S1 and S2. Alternatively, in boost mode, switches S1 and S2 are closed and open, respectively, while PWM signals are provided to switches S3 and S4.

A problem with bridge 100, however, is that there are some practical constraints that limit the ability to seamlessly transition between the buck and boost modes, namely, on-time and dead-time. Looking to buck mode, for example, switch S1 (or S2) cannot seamlessly reach 100% duty cycle. As can be seen in FIG. 2, switch S2, for example, has a minimum on-time $T_{ON}$ (which is generally dictated by the physics of switch S2), and there is a dead-time $T_{DEAD}$ between a rising/falling edge of the PWM signal for switch S1 and the falling/rising edge of the PWM signal for switch S2. If the total on-time for switch S1 (for example) for a fixed frequency of $1/T$ (duty cycle in buck mode $D_{BU}$ times the period T) is greater than the period T minus this predetermined constraint period ($D_{BU}*T>T-2T_{DEAD}-T_{ON}$), then the gain ($V_{OUT}/V_{IN}$) of the regulator can deviate from an expected value.

Thus, there is a need for an improved switching regulator.

Some other conventional circuits are: U.S. Pat. No. 6,166,527; U.S. Pat. No. 6,037,755; and U.S. Patent Pre-Grant Publ. No. 2009/0039852.

SUMMARY

A preferred embodiment of the present invention, accordingly, provides an apparatus. The apparatus comprises a buck-boost switching regulator having an input terminal, an output terminal, a predetermined buck gain, a predetermined boost gain, a predetermined dead-time, and a predetermined on-time; and control circuitry that is coupled to at least one of the output terminal and the input terminal and that controls the buck-boost switching regulator, wherein the control circuitry employs a compensation function to determine pulse width modulation (PWM) duty cycles for the buck-boost switching regulator, wherein the control circuitry includes a processor and a storage medium with a computer program product embodied thereon, and wherein the computer program product includes: computer code for operating the buck-boost switching regulator in a buck mode when an output of the compensation function is less than the predetermined buck gain; computer code for operating the buck-boost switching regulator in the bridge mode when the output of the compensation function is between the predetermined buck gain and the predetermined boost gain; and computer code for operating the buck-boost switching regulator in a boost mode when the output of the compensation function is greater than the predetermined boost gain.

In accordance with a preferred embodiment of the present invention, the computer code for operating the buck-boost switching regulator in the bridge mode when the output of the compensation function is between the predetermined buck gain and the predetermined boost gain further comprises: computer code for operating the buck-boost switching regulator in a first bridge mode when the output of the compensation function is between the predetermined buck gain and an intermediate value; and computer code for operating the buck-boost switching regulator in a second bridge mode when the output of the compensation function is between the intermediate value and the predetermined boost gain.

In accordance with a preferred embodiment of the present invention, the buck-boost switching regulator further comprises: a first switch that is coupled between the input terminal and a first switching node; a second switching that is coupled between the first switching node and ground; an inductor that is coupled between the first switching node and a second switching node; a third switch that is coupled between the second switching node and ground; and a fourth switching that is coupled between the second switching node and the output terminal.

In accordance with a preferred embodiment of the present invention, the computer code for operating the buck-boost switching regulator in the first bridge mode when the output of the compensation function is between the predetermined buck gain and the intermediate value further comprises: computer code for operating the first switch at a first duty cycle having a value that is the difference between the output of the compensation function and a first constant value; and computer code for operating the third switch at a second duty cycle that is a second constant value, wherein a gain of buck-boost switching regulator, in the first bridge mode, is the product of a third constant and the value of the first duty cycle.

In accordance with a preferred embodiment of the present invention, the computer code for operating the buck-boost switching regulator in the second bridge mode when the output of the compensation function is between the intermediate value and the predetermined boost gain further comprises: computer code for operating the first switch at a third duty cycle having a fourth constant value; and computer code for operating the third switch at a fourth duty cycle having a value that is the difference between the output of the compensation function and a fifth constant value, wherein a gain of the buck-boost switching regulator, in the second bridge mode, is the product of the fourth constant value and a difference between a sixth constant value and the output of the compensation function.

In accordance with a preferred embodiment of the present invention, the control circuitry further comprises: a voltage divider that is coupled to the output terminal; and an error amplifier that receives a reference voltage and that is coupled to the voltage divider and the processor.

In accordance with a preferred embodiment of the present invention, the processor is a digital signals processor (DSP).

In accordance with a preferred embodiment of the present invention, a method is provided. The method comprises detecting at least one of an input voltage, an output voltage, an input current, and an output current of a buck-boost switching regulator, wherein buck-boost switching regulator includes a predetermined buck gain, a predetermined boost gain, a predetermined dead-time, and a predetermined on-time, and wherein the buck-boost switching regulator includes: a first switch that is coupled between the input terminal and a first switching node; a second switching that is coupled between the first switching node and ground; an inductor that is coupled between the first switching node and a second switching node; a third switch that is coupled between the second switching node and ground; and a fourth switching that is coupled between the second switching node and the output terminal; operating the buck-boost switching regulator in a buck mode when an output of the compensation function is less than the predetermined buck gain; operating the buck-boost switching regulator in a first bridge mode when the output of the compensation function is between the predetermined buck gain and an intermediate value; operating the buck-boost switching regulator in a second bridge mode when the output of the compensation function is between the intermediate value and the predetermined boost gain; and operating the buck-boost switching regulator in a boost mode when the output of the compensation function is greater than the predetermined boost gain.

In accordance with a preferred embodiment of the present invention, the step of operating the buck-boost switching regulator in the first bridge mode when the output of the compensation function is between the predetermined buck gain and the intermediate value further comprises: operating the first switch at a first duty cycle having a value that is the difference between the output of the compensation function and a first constant value; and operating the third switch at a second duty cycle that is a second constant value, wherein a gain of buck-boost switching regulator, in the first bridge mode, is the product of a third constant value and the value of the first duty cycle.

In accordance with a preferred embodiment of the present invention, the step of operating the buck-boost switching regulator in the second bridge mode when the output of the compensation function is between the intermediate value and the predetermined boost gain further comprises: operating the first switch at a third duty cycle having a fourth constant value; and operating the third switch at a fourth duty cycle having a value that is the difference between the output of the compensation function and a fifth constant value, wherein a gain of the buck-boost switching regulator, in the second bridge mode, is the product of the fourth constant value and a difference between a sixth constant value and the output of the compensation function.

In accordance with a preferred embodiment of the present invention, an apparatus is provided. The apparatus comprises a solar cell; a buck-boost switching regulator having an input terminal, an output terminal, a predetermined buck gain, a predetermined boost gain, a predetermined dead-time, and a predetermined on-time, wherein the input terminal is coupled to the solar cell; and control circuitry that is coupled to the output terminal and that controls the buck-boost switching regulator, wherein the control circuitry employs a compensation function to determine PWM duty cycles for the buck-boost switching regulator, wherein the control circuitry includes a processor and a storage medium with a computer program product embodied thereon, and wherein the computer program product includes: computer code for operating the buck-boost switching regulator in a buck mode when an output of the compensation function is less than the predetermined buck gain; computer code for operating the buck-boost switching regulator in a first bridge mode when the output of the compensation function is between the predetermined buck gain and an intermediate value; computer code for operating the buck-boost switching regulator in a second bridge mode when the output of the compensation function is between the intermediate value and the predetermined boost gain; and computer code for operating the buck-boost switching regulator in a boost mode when the output of the compensation function is greater than the predetermined boost gain.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
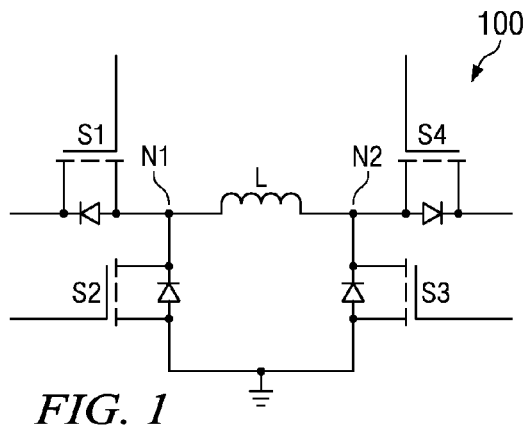
FIG. 1 is a circuit diagram of a conventional bridge.
Figure 2:
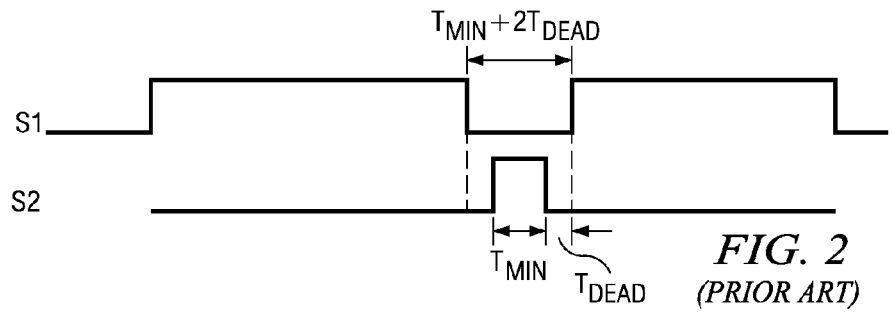
FIG. 2 is a timing diagram illustrating constraints of operation of the bridge of FIG. 1.

Refer now to the drawings wherein depicted elements are, for the sake of clarity, not necessarily shown to scale and wherein like or similar elements are designated by the same reference numeral through the several views.

Figure 3:
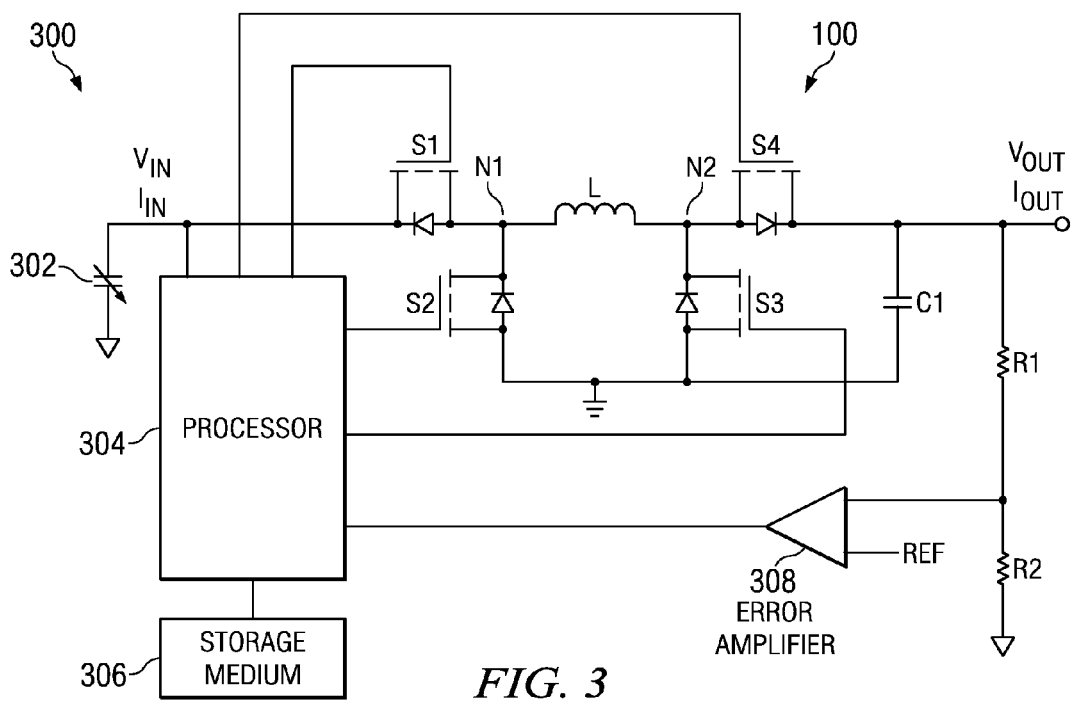
FIG. 3 is an example of a system in accordance with a preferred embodiment of the present invention.

Turning to FIG. 3 of the drawings, an example of a system 300 in accordance with a preferred embodiment of the present invention can be seen. System 100 generally comprises a bridge 100, solar cell 302, capacitor C1, voltage divider (resistors R1 and R2), error amplifier 308, processor 304, and storage medium 306. Collectively, the voltage divider, error amplifier 308, processor 304, and storage medium 306 generally operate as a control circuitry, while bridge 100 and capacitor C1 generally operate as a buck-boost switching regulator. In operation, an input voltage $V_{IN}$ and input current $I_{IN}$ are provide to the input terminal of the switching regulator from, for example, a solar cell 302 (which may include multiple solar cells coupled in series or parallel to the input terminal) so as to generate an output voltage $V_{OUT}$ and an output current $I_{OUT}$ at the output terminal. The control circuitry measures the output voltage $V_{OUT}$ and the input voltage $V_{IN}$ and generates the appropriate PWM signals for switches S1 through S4. The error amplifier 308 compares an output from the voltage divider to a reference voltage REF so that the processor 304 can perform correction of the PWM signals. In an alternative arrangement, the error amplifier 308 and voltage divider can be removed, with the functionality being provided by the processor 304. In other alternative arrangements, input current $I_{IN}$, output current $I_{OUT}$, or input voltage $V_{IN}$ may be used instead of the output voltage $V_{OUT}$ for correction of the PWM signals. Additionally, the processor 304 may be a digital signals processor or DSP.

For conventional bridge switching or buck-boost operation, pairs of switches S1/S3 or S2/S4 are switched on and off at about the same time, and the duty cycle $D_{BR}$ is the fraction of the cycle that that switches S1/S3 are on. This switching mode operates generally smoothly through a gain G (ratio of the output voltage $V_{OUT}$ to the input voltage $V_{IN}$) of 1, but it also dissipates more power than either the buck mode or boost mode. The excessive power dissipation is generally due to there being four active switches (instead of two) and generally due to there being a higher average inductor current $I_L$ than in either the buck mode ($I_L=I_{OUT}$) or boost mode ($I_L=I_{IN}$); namely, the average inductor current $I_L$ is the sum of the input current $I_{IN}$ and output current $I_{OUT}$ ($I_L=I_{IN}+I_{OUT}$).

A reduction in this average inductor current $I_L$ is possible, however. Assuming that the duty cycles of the buck (for switches S1 and S2) and boost (for switches S3 and S4) sides are independent and assuming that the buck duty cycle $D_{BU}$ (or boost duty cycle $D_{BO}$) represents a fraction of the switching period T that switch S1 (or S3) is on, the gain G and inductor current IL can be represented as follows:

$$G = \frac{V_{OUT}}{V_{IN}} = \frac{D_{BU}}{1 - D_{BO}} \quad (1)$$

$$I_L = \frac{I_{IN} + I_{OUT}}{1 + D_{BU} - D_{BO}} \quad (2)$$

As shown, the gain G shows that there is a continuum of buck duty cycle $D_{BU}$ and boost duty cycle $D_{BO}$ combinations that will produce a gain G, so long as the relationship between buck duty cycle $D_{BU}$ and boost duty cycle $D_{BO}$ is obeyed (i.e., $D_{BU}=G(1-D_{BO})$). Additionally, it can be seen that a large buck duty cycle $D_{BU}$ and a small boost duty cycle $D_{BO}$ create a substantial reduction in inductor current $I_L$. Generally, control of the these duty cycles $D_{BU}$ and $D_{BO}$ is performed or executed by processor 304 through the use of software or a computer program product that is embodied on the storage medium 306 (i.e., flash memory).

Each bridge (i.e., 100) generally has predetermined characteristics, such as a predetermined dead-time, a predetermined on-time, a predetermined maximum buck gain, and a predetermined minimum boost gain. Each of these characteristics generally contribute to the bridge operational modes; typically, two bridge modes are employed. When an output of a compensation function D (which is generated by processor 304 and used to determine PWM duty cycles) is less then the predetermined maximum buck gain, the switching regulator operates in buck mode, and when the output of the compensation function D is greater than the predetermined minimum boost gain, the switching regulator operates in boost mode. However, when the output of the compensation function D is between the predetermined maximum buck gain and a constant value, the switching regulator operates in an initial bridge mode, where:

$$D_{BU}=D-C_1; \text{ and} \quad (3)$$

$$D_{BO}=C_2, \quad (4)$$

where $C_1$ and $C_2$ are constant values. Now, applying equations (1) and (2) to equations (3) and (4), the gain G and ratio of the inductor current $I_L$ to the input current $I_{IN}$ for the initial bridge mode are:

$$G = \frac{D - C_1}{1 - C_2} \quad (5)$$

$$\frac{I_L}{I_{IN}} = \left(1 + \frac{I_{OUT}}{I_{IN}}\right)\frac{1}{1 + D - C_1 - C_2} \quad (6)$$

Additionally, when the output of the compensation function D is between a constant value and the predetermined minimum boost gain, the switching regulator operates in an final bridge mode, where:

$$D_{BU}=C_3; \text{ and} \quad (7)$$

$$D_{BO}=D-C_4, \quad (8)$$

where $C_3$ and $C_4$ are constant values. Now, applying equations (1) and (2) to equations (7) and (8), the gain G and ratio of the inductor current $I_L$ to the input current $I_{IN}$ for the final bridge mode are:

$$G = \frac{C_3}{1 - D + C_4} \quad (9)$$

$$\frac{I_L}{I_{IN}} = \left(1 + \frac{I_{OUT}}{I_{IN}}\right)\frac{1}{1 + C_3 - D + C_4} \quad (10)$$

In order to further illustrate the operation of bridge modes for system 300, it can be assumed for the sake of illustration for Table 1 that the switching period T, maximum buck gain, minimum boost gain, dead-time, and on-time are 4000 ns, 0.9, 1.0292, 150 ns, and 133 ns, respectively.

TABLE 1

| Mode | D | $D_{BU}$ | $D_{BO}$ | G | $I_L/I_{IN}$ |
| --- | --- | --- | --- | --- | --- |
| Buck | D ≦ 0.9 | D | 0 | $D_{BU}$ | $1/D_{BU}$ |
| Initial Bridge | 0.9 < D < 0.9292 | D − 0.0292 | 0.03333 | 1.0345(D − 0.0292) | 1/(D − 0.0292) |
| Final Bridge | 0.9292 < D < 1.0333 | 0.9 | D − 0.8958 | 0.9/(1.8958 − D) | 1.111 |
| Boost | D > 1.0333 | 1 | D − 1 | 1/D | 1 |

In order to realize these bridge modes in processor 304 and storage medium 306, an algorithm is provided that adjusts the boost duty cycle $D_{BO}$ and buck duty cycle $D_{BU}$ in terms of a controller clock cycles (i.e., 1/60 MHz=16.67 ns). In Table 2 below, the gain G and ratio of the inductor current $I_L$ to the input current $I_{IN}$, buck duty cycle $D_{BU}$, and boost duty cycle $D_{BO}$ can be seen for an example of this algorithm.

TABLE 2

| Mode | D | $D_{BU}$ | $D_{BO}$ | G | $I_L/I_{IN}$ |
| --- | --- | --- | --- | --- | --- |
| Buck | 210 | 210 | 0 | 0.875 | 1.143 |
| Buck | 211 | 211 | 0 | 0.879 | 1.137 |
| Buck | 212 | 212 | 0 | 0.883 | 1.132 |
| Buck | 213 | 213 | 0 | 0.888 | 1.127 |
| Buck | 214 | 214 | 0 | 0.892 | 1.121 |
| Buck | 215 | 215 | 0 | 0.896 | 1.116 |
| Buck | 216 | 216 | 0 | 0.900 | 1.111 |
| Initial Bridge | 217 | 210 | 8 | 0.905 | 1.143 |
| Initial Bridge | 218 | 211 | 8 | 0.909 | 1.137 |

TABLE 2-continued

| Mode | D | $D_{BU}$ | $D_{BO}$ | G | $I_L/I_{IN}$ |
|---|---|---|---|---|---|
| Initial Bridge | 219 | 212 | 8 | 0.914 | 1.132 |
| Initial Bridge | 220 | 213 | 8 | 0.918 | 1.127 |
| Initial Bridge | 221 | 214 | 8 | 0.922 | 1.121 |
| Initial Bridge | 222 | 215 | 8 | 0.927 | 1.116 |
| Initial Bridge | 223 | 216 | 8 | 0.931 | 1.111 |
| Final Bridge | 224 | 216 | 9 | 0.935 | 1.111 |
| Final Bridge | 225 | 216 | 10 | 0.939 | 1.111 |
| Final Bridge | 226 | 216 | 11 | 0.943 | 1.111 |
| Final Bridge | 227 | 216 | 12 | 0.947 | 1.111 |
| Final Bridge | 228 | 216 | 13 | 0.952 | 1.111 |
| Final Bridge | 229 | 216 | 14 | 0.956 | 1.111 |
| Final Bridge | 230 | 216 | 15 | 0.960 | 1.111 |
| Final Bridge | 231 | 216 | 16 | 0.964 | 1.111 |
| Final Bridge | 232 | 216 | 17 | 0.969 | 1.111 |
| Final Bridge | 233 | 216 | 18 | 0.973 | 1.111 |
| Final Bridge | 234 | 216 | 19 | 0.977 | 1.111 |
| Final Bridge | 235 | 216 | 20 | 0.982 | 1.111 |
| Final Bridge | 236 | 216 | 21 | 0.986 | 1.111 |
| Final Bridge | 237 | 216 | 21 | 0.986 | 1.111 |
| Final Bridge | 238 | 216 | 22 | 0.991 | 1.111 |
| Final Bridge | 239 | 216 | 23 | 0.995 | 1.111 |
| Final Bridge | 240 | 216 | 24 | 1.000 | 1.111 |
| Final Bridge | 241 | 216 | 25 | 1.005 | 1.111 |
| Final Bridge | 242 | 216 | 26 | 1.009 | 1.111 |
| Final Bridge | 243 | 216 | 27 | 1.014 | 1.111 |
| Final Bridge | 244 | 216 | 28 | 1.019 | 1.111 |
| Final Bridge | 245 | 216 | 29 | 1.024 | 1.111 |
| Final Bridge | 246 | 216 | 30 | 1.029 | 1.111 |
| Final Bridge | 247 | 216 | 31 | 1.033 | 1.111 |
| Boost | 248 | 240 | 8 | 1.034 | 1.000 |
| Boost | 249 | 240 | 9 | 1.034 | 1.000 |

As a result of this configuration, several advantages can be realized. First, there is a relatively seamless transition between buck mode and boost mode, which can be useful for solar applications, where input voltage and input current are generally inflexible. Additionally, the average inductor current $I_L$ can be reduced, which reduces power losses within the switching regulator.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   a buck-boost switching regulator having an input terminal, an output terminal, a predetermined buck gain, a predetermined boost gain, a predetermined dead-time, and a predetermined on-time; and
   control circuitry that is coupled to at least one of the output terminal and the input terminal and that controls the buck-boost switching regulator, wherein the control circuitry employs a compensation function to determine pulse width modulation (PWM) duty cycles for the buck-boost switching regulator, wherein the control circuitry includes a processor and a storage medium with a computer program product embodied thereon, and wherein the computer program product includes:
      computer code for operating the buck-boost switching regulator in a buck mode when an output of the compensation function is less than the predetermined buck gain;
      computer code for operating the buck-boost switching regulator in a first bridge mode when the output of the compensation function is between the predetermined buck gain and an intermediate value;
      computer code for operating the buck-boost switching regulator in a second bridge mode when the output of the compensation function is between the predetermined boost gain; and
      computer code for operating the buck-boost switching regulator in a boost mode when the output of the compensation function is greater than the predetermined boost gain.

2. The apparatus of claim 1, wherein the buck-boost switching regulator further comprises:
   a first switch that is coupled between the input terminal and a first switching node;
   a second switching that is coupled between the first switching node and ground;
   an inductor that is coupled between the first switching node and a second switching node;
   a third switch that is coupled between the second switching node and ground; and
   a fourth switching that is coupled between the second switching node and the output terminal.

3. The apparatus of claim 2, wherein the computer code for operating the buck-boost switching regulator in the first bridge mode when the output of the compensation function is between the predetermined buck gain and the intermediate value further comprises:
   computer code for operating the first switch at a first duty cycle having a value that is the difference between the output of the compensation function and a first constant value; and
   computer code for operating the third switch at a second duty cycle that is a second constant value, wherein a gain of buck-boost switching regulator, in the first bridge mode, is the product of a third constant and the value of the first duty cycle.

4. The apparatus of claim 3, wherein the computer code for operating the buck-boost switching regulator in the second bridge mode when the output of the compensation function is between the intermediate value and the predetermined boost gain further comprises:
   computer code for operating the first switch at a third duty cycle having a fourth constant value; and
   computer code for operating the third switch at a fourth duty cycle having a value that is the difference between the output of the compensation function and a fifth constant value, wherein a gain of the buck-boost switching regulator, in the second bridge mode, is the product of the fourth constant value and a difference between a sixth constant value and the output of the compensation function.

5. The apparatus of claim 4, wherein the control circuitry further comprises:
   a voltage divider that is coupled to the output terminal; and
   an error amplifier that receives a reference voltage and that is coupled to the voltage divider and the processor.

6. The apparatus of claim 4, wherein the processor is a digital signals processor (DSP).

7. A method comprising:
   detecting at least one of an input voltage, an output voltage, an input current, and an output current of a buck-boost switching regulator, wherein buck-boost switching regulator includes a predetermined buck gain, a predetermined boost gain, a predetermined dead-time, and a predetermined on-time, and wherein the buck-boost switching regulator includes:
- a first switch that is coupled between the input terminal and a first switching node;
- a second switching that is coupled between the first switching node and ground;
- an inductor that is coupled between the first switching node and a second switching node;
- a third switch that is coupled between the second switching node and ground; and
- a fourth switching that is coupled between the second switching node and the output terminal;

operating the buck-boost switching regulator in a buck mode when an output of a compensation function is less than the predetermined buck gain, wherein the compensation function determines PWM duty cycles for the buck-boost switching regulator;

operating the buck-boost switching regulator in a first bridge mode when the output of the compensation function is between the predetermined buck gain and an intermediate value;

operating the buck-boost switching regulator in a second bridge mode when the output of the compensation function is between the intermediate value and the predetermined boost gain; and operating the buck-boost switching regulator in a boost mode when the output of the compensation function is greater than the predetermined boost gain.

8. The apparatus of claim 7, wherein the step of operating the buck-boost switching regulator in the first bridge mode when the output of the compensation function is between the predetermined buck gain and the intermediate value further comprises:
- operating the first switch at a first duty cycle having a value that is the difference between the output of the compensation function and a first constant value; and
- operating the third switch at a second duty cycle that is a second constant value, wherein a gain of buck-boost switching regulator, in the first bridge mode, is the product of a third constant value and the value of the first duty cycle.

9. The apparatus of claim 8, wherein the step of operating the buck-boost switching regulator in the second bridge mode when the output of the compensation function is between the intermediate value and the predetermined boost gain further comprises:
- operating the first switch at a third duty cycle having a fourth constant value; and
- operating the third switch at a fourth duty cycle having a value that is the difference between the output of the compensation function and a fifth constant value, wherein a gain of the buck-boost switching regulator, in the second bridge mode, is the product of the fourth constant value and a difference between a sixth constant value and the output of the compensation function.

10. An apparatus comprising:
- a solar cell;
- a buck-boost switching regulator having an input terminal, an output terminal, a predetermined buck gain, a predetermined boost gain, a predetermined dead-time, and a predetermined on-time, wherein the input terminal is coupled to the solar cell; and
- control circuitry that is coupled to the output terminal and that controls the buck-boost switching regulator, wherein the control circuitry employs a compensation function to determine PWM duty cycles for the buck-boost switching regulator, wherein the control circuitry includes a processor and a storage medium with a computer program product embodied thereon, and wherein the computer program product includes:
  - computer code for operating the buck-boost switching regulator in a buck mode when an output of the compensation function is less than the predetermined buck gain;
  - computer code for operating the buck-boost switching regulator in a first bridge mode when the output of the compensation function is between the predetermined buck gain and an intermediate value;
  - computer code for operating the buck-boost switching regulator in a second bridge mode when the output of the compensation function is between the intermediate value and the predetermined boost gain; and
  - computer code for operating the buck-boost switching regulator in a boost mode when the output of the compensation function is greater than the predetermined boost gain.

11. The apparatus of claim 10, wherein the buck-boost switching regulator further comprises:
- a first switch that is coupled between the input terminal and a first switching node;
- a second switching that is coupled between the first switching node and ground;
- an inductor that is coupled between the first switching node and a second switching node;
- a third switch that is coupled between the second switching node and ground; and
- a fourth switching that is coupled between the second switching node and the output terminal.

12. The apparatus of claim 11, wherein the computer code for operating the buck-boost switching regulator in the first bridge mode when the output of the compensation function is between the predetermined buck gain and the intermediate value further comprises:
- computer code for operating the first switch at a first duty cycle having a value that is the difference between the output of the compensation function and a first constant value; and
- computer code for operating the third switch at a second duty cycle that is a second constant value, wherein a gain of buck-boost switching regulator, in the first bridge mode, is the product of a third constant value and the value of the first duty cycle.

13. The apparatus of claim 12, wherein the computer code for operating the buck-boost switching regulator in the second bridge mode when the output of the compensation function is between the intermediate value and the predetermined boost gain further comprises:
- computer code for operating the first switch at a third duty cycle having a fourth constant value; and
- computer code for operating the third switch at a fourth duty cycle having a value that is the difference between the output of the compensation function and a fifth constant value, wherein a gain of the buck-boost switching regulator, in the second bridge mode, is the product of the fourth constant value and a difference between a sixth constant value and the output of the compensation function.

14. The apparatus of claim 13, wherein the control circuitry further comprises:
- a voltage divider that is coupled to the output terminal; and
- an error amplifier that receives a reference voltage and that is coupled to the voltage divider and the processor.

15. The apparatus of claim 13, wherein the processor is a DSP.

16. The apparatus of claim 13, wherein the solar cell further comprises a plurality of solar cells.

* * * * *